(12) United States Patent
Mandelbaum et al.

(10) Patent No.: US 11,433,824 B2
(45) Date of Patent: Sep. 6, 2022

(54) FOLDING STORAGE COMPARTMENT

(71) Applicant: Ford Global Technologies, LLC, Dearborn, MI (US)

(72) Inventors: Dylan Mandelbaum, Mountain View, CA (US); Siddharthan Selvasekar, Livermore, CA (US); Sydney Puckett, Oak Park, MI (US); Andres Almeida Senatore, San Jose, CA (US); Michael Steven Medoro, Sunnyvale, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 119 days.

(21) Appl. No.: 17/109,201

(22) Filed: Dec. 2, 2020

(65) Prior Publication Data
US 2022/0169183 A1 Jun. 2, 2022

(51) Int. Cl.
*B60R 7/06* (2006.01)
(52) U.S. Cl.
CPC ..................... *B60R 7/06* (2013.01)
(58) Field of Classification Search
CPC ............................................... B60R 7/06
USPC .......................................... 296/37.12
See application file for complete search history.

(56) References Cited

U.S. PATENT DOCUMENTS

| | | | | |
|---|---|---|---|---|
| 3,904,106 A * | 9/1975 | Elder | ................... | B65D 5/2076 229/160 |
| 5,795,005 A * | 8/1998 | Garfias | ................... | B60R 7/046 312/275 |
| 6,102,569 A | 8/2000 | Wang | | |
| 6,672,640 B2 | 1/2004 | Gehring et al. | | |
| 7,093,873 B2 * | 8/2006 | Nilsrud | ..................... | B60R 7/02 296/37.14 |
| 8,746,544 B2 | 6/2014 | Cruz | | |
| 8,961,167 B2 | 2/2015 | Swanson et al. | | |
| 9,744,726 B2 | 8/2017 | Levine et al. | | |
| 10,336,261 B2 * | 7/2019 | White | ..................... | B60R 5/048 |
| 11,104,275 B2 * | 8/2021 | Ito | ............................. | B60R 5/045 |
| 2015/0175080 A1 * | 6/2015 | Kmita | ....................... | B60R 5/04 296/37.5 |

FOREIGN PATENT DOCUMENTS

DE    102018131618 B3    2/2020

* cited by examiner

*Primary Examiner* — Pinel E Romain
(74) *Attorney, Agent, or Firm* — Vichit Chea; Price Heneveld LLP

(57) ABSTRACT

A storage compartment includes, front and rear panels with first and second side panels operably coupled between the front and rear panels. Each side panel includes first and second portions interconnected along an articulating joint for movement between folded and extended positions. A bottom panel includes first and second portions interconnected along an articulating joint, for movement between folded and extended positions. The front, rear and bottom panels, and the first and second side panels are made using an additive manufacturing process to create a storage compartment that is fully integrated. The panels further cooperate to define an interior vessel that is operable between deployed and retracted conditions. In the retracted condition, the interior vessel provides for a storage compartment with a minimized profile, such that multiple storage compartments can be additively manufactured in a single build box if an additive manufacturing device.

20 Claims, 12 Drawing Sheets

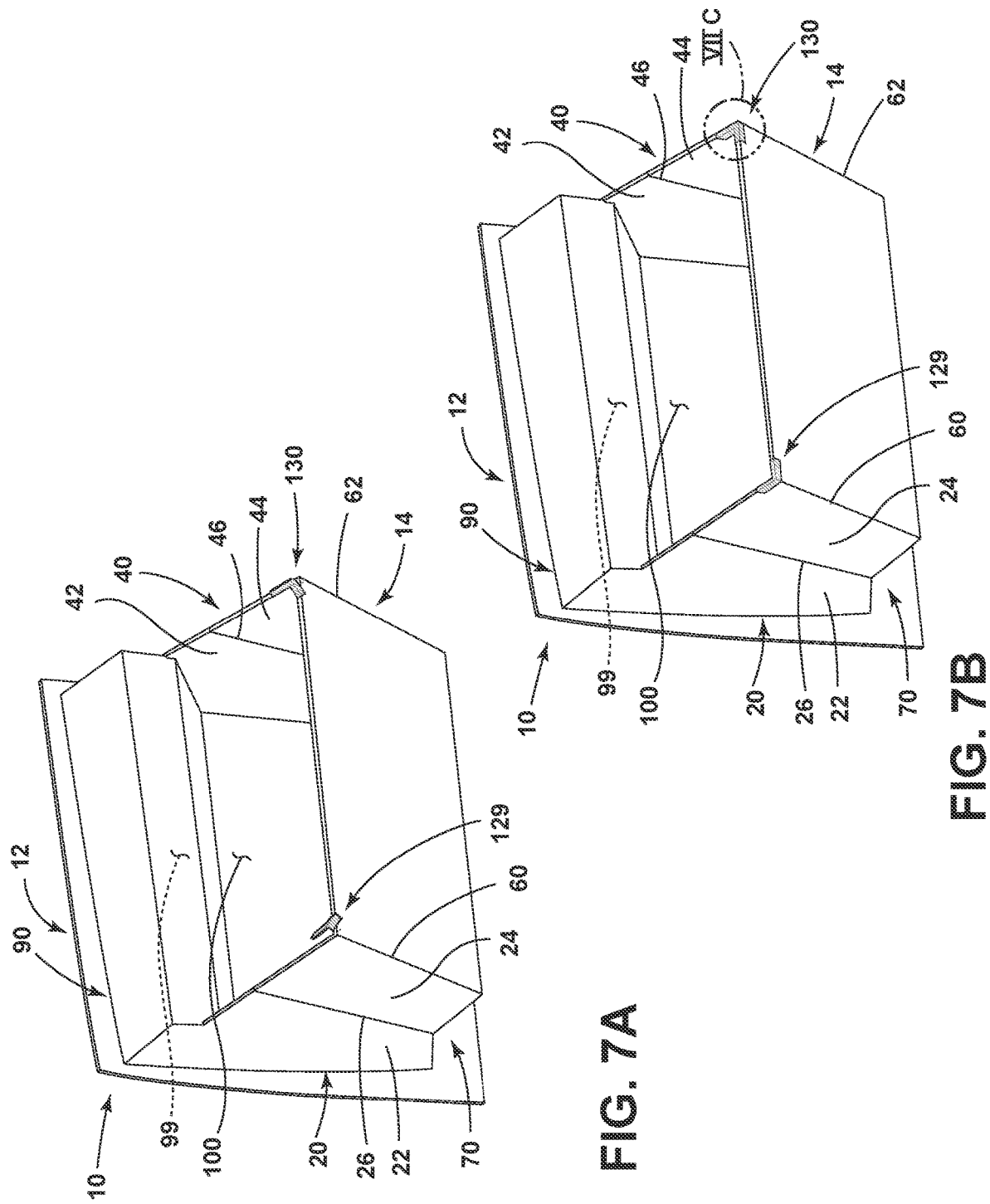

FOLDING STORAGE COMPARTMENT

FIELD OF THE DISCLOSURE

The present invention relates to a storage compartment for a vehicle, and more particularly, to a storage compartment that includes a number of folding members to reduce an occupied volume of the storage compartment in a build box of an additive manufacturing device.

BACKGROUND OF THE DISCLOSURE

Storage compartments are commonly used to provide storage solutions within a vehicle, and are often assembled using injection molded rigid panels. The present concept seeks to provide an additively manufactured storage compartment that has folding panels to make for efficient use of space in a build box of an additive manufacturing device.

SUMMARY OF THE DISCLOSURE

According to a first aspect of the present disclosure, a storage compartment includes a front panel having an inner surface. A first side panel includes first and second portions. The first portion of the first side panel is pivotally coupled to the inner surface of the front panel. The second portion of the first side panel is pivotally coupled to the first portion of the first side panel. A second side panel is spaced-apart from the first side panel and includes first and second portions. The first portion of the second side panel is pivotally coupled to the inner surface of the front panel. The second portion of the second side panel is pivotally coupled to the first portion of the second side panel. A rear panel includes first and second ends. The first end is pivotally coupled to the second portion of the first side panel. The second end is pivotally coupled to the second portion of the second side panel.

According to a second aspect of the present disclosure, a glovebox for a vehicle includes front and rear panels interconnected at respective inner surfaces thereof by first and second folding side panels. The front and rear panels and the first and second folding side panels cooperate to define an interior vessel. The interior vessel is operable between deployed and retracted conditions. The front and rear panels are spaced-apart from one another a first distance when the interior vessel is in the retracted condition. The front and rear panels are spaced-apart from one another a second distance that is greater than the first distance when the interior vessel is in the deployed condition.

According to a third aspect of the present disclosure, a storage compartment includes a front panel having an inner surface. A first side panel include first and second portions interconnected along an articulating joint. The first portion of the first side panel is operably coupled to the inner surface of the front panel. A second side panel includes first and second portions interconnected along an articulating joint. The first portion of the second side panel is operably coupled to the inner surface of the front panel. The first and second side panels are operable between inwardly folded and extended positions. A bottom panel includes first and second portions interconnected along an articulating joint. The first portion of the bottom panel is operably coupled to the inner surface of the front panel. A rear panel includes first and second ends. The first end is pivotally coupled to the second portion of the first side panel along an articulating joint. The second end is pivotally coupled to the second portion of the second side panel along an articulating joint.

These and other aspects, objects, and features of the present disclosure will be understood and appreciated by those skilled in the art upon studying the following specification, claims, and appended drawings.

BRIEF DESCRIPTION OF THE DRAWINGS

In the drawings:

FIG. 7A is a rear top perspective view of the storage compartment of FIG. 1 having clip members in disengaged positions on a rear panel of the storage compartment;

FIG. 7B is a rear top perspective view of the storage compartment of FIG. 7A with the clip members in engaged positions;

DETAILED DESCRIPTION OF THE PREFERRED EMBODIMENTS

Additional features and advantages of the present disclosure will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Figure 1:
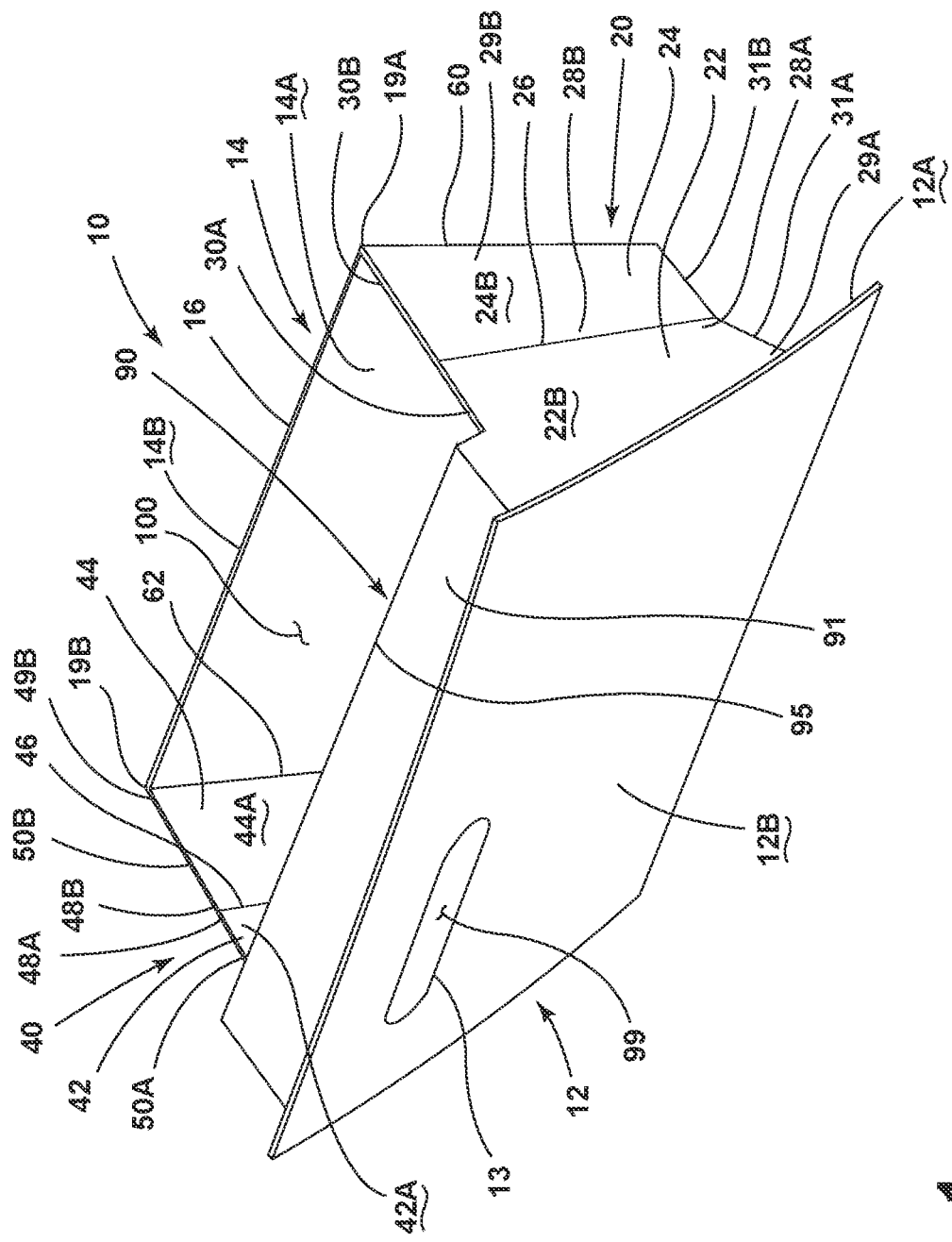
FIG. 1 is a front top perspective view of a storage compartment having an interior vessel in a deployed condition.

Referring now to FIG. 1, a storage compartment 10 is shown according to an embodiment of the present concept. The storage compartment 10 is shown in the form of a glovebox that is contemplated for use in a vehicle. Specifically, the storage compartment 10 may be positioned in a dashboard or instrument panel within a vehicle interior, often located on a passenger's side of the vehicle interior. As such, the storage compartment 10 may be referred to herein as a glovebox. The storage compartment 10 of the present concept is contemplated to be manufactured using an additive manufacture process to create a fully integrated or unitary part. As used herein, the term "integrated" refers to component parts of a unitary whole that are formed together in a single build process using an additive manufacturing device (such as a three-dimensional (3D) printer) to provide the integrated article. In this way, the term "unitary" is used herein to describe component parts that are formed together as a unitary whole, as distinguished from component parts that are separately formed and later operably coupled to one another in assembly. Using and additive manufacturing technique, the storage compartment 10 is contemplated to be comprised of a build material constructed using an additive manufacturing device, whereby a layer-by-layer deposition process is used to print, or otherwise deposit, the build material in a specifically dimensioned build box of the additive manufacturing device. The build material may include a polymeric material that is cured after deposition to form the various component parts of the storage compartment 10. As further described below, the process of additively manufacturing the storage compartment 10 may include selective dimensioning of particular portions of the storage compartment 10 to create foldable panels that allow for maximization of the available build box dimensions.

With further reference to FIG. 1, the storage compartment 10 includes a front panel 12 having inner and outer surfaces 12A, 12B. An access aperture 13 is shown disposed through the front panel 12 and is contemplated to receive a handle assembly used to activate a latch mechanism, as further described below. The access aperture 13 opens into a latch housing 99, as further described below. The storage compartment 10 further includes a rear panel 14 having inner and outer surfaces 14A, 14B. The rear panel 14 further includes an upper edge 16 and a lower edge 18 (FIG. 2) along with first and second ends 19A, 19B. The front and rear panels 12, 14 are contemplated to be rigid members that include generally planar body portions defined by the respective inner and outer surfaces 12A, 12B and 14A, 14B thereof. The storage compartment 10 further includes a plurality of foldable members as will now be described.

Figure 2:
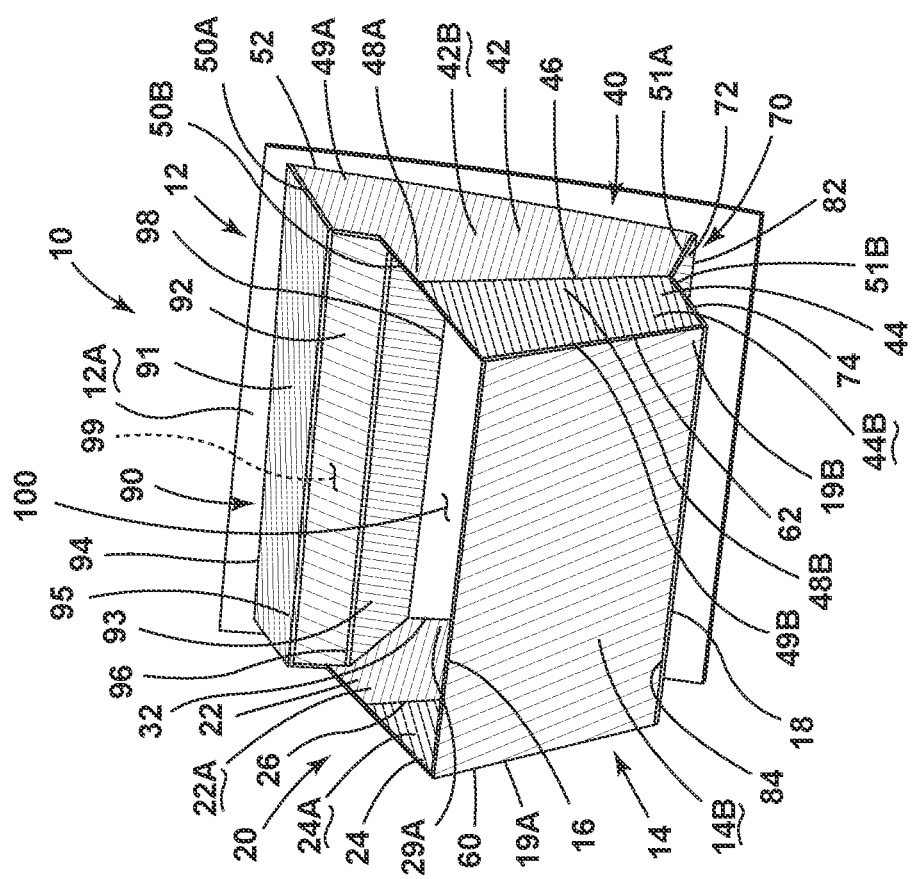
FIG. 2 is a rear top perspective view of the storage compartment of FIG. 1.

With further reference to FIG. 1, the storage compartment 10 includes a first side panel 20 having first and second portions 22, 24. The first and second portions 22, 24 of the first side panel 20 are contemplated to be rigid members having generally planar body portions with respective inner and outer surfaces 22A (FIG. 2), 22B and 24A (FIG. 2), 24B. The first and second portions 22, 24 of the first side panel 20 are pivotally coupled to one another along an articulating joint 26. As further shown in FIG. 1, the storage compartment 10 also includes a second side panel 40 having first and second portions 42, 44. The first and second portions 42, 44 of the second side panel 40 are contemplated to be rigid members having generally planar body portions with respective inner and outer surfaces 42A, 42B (FIGS. 2) and 44A, 44B (FIG. 2). Much like the first side panel 20, the first and second portions 42, 44 of the second side panel 40 are pivotally coupled to one another along an articulating joint 46. In this way, the first and second side panels 20, 40 of the storage compartment 10 are folding side panels that are operable between folded and extended positions. In the embodiment shown in FIG. 1, the first and second side panels 20, 40 of the storage compartment 10 are shown in extended positions.

As further shown in FIG. 1, the first portion 22 of the first side panel 20 includes an inner edge 28A and an outer edge 29A. The first portion 22 of the first side panel 20 further includes an upper edge 30A and a lower edge 31A. Similarly, the second portion 24 of the first side panel 20 includes an inner edge 28B and an outer edge 29B. The second portion 24 of the first side panel 20 further includes an upper edge 30B and a lower edge 31B. As shown in FIG. 1, the articulating joint 26 positioned between the first and second portions 22, 24 of the first side panel 20 is disposed along the respective inner edges 28A, 28B of the first and second portions 22, 24 of the first side panel 20. The first portion 22 of the first side panel 20 is contemplated to be pivotally coupled to the inner surface 12A of the front panel 12 at an articulating joint 32 (FIG. 2) that is disposed along the outer edge 29A of the first portion 22 of the first side panel 20.

With further reference to FIG. 1, the first portion 42 of the second side panel 40 includes an inner edge 48A and an outer edge 49A (FIG. 2). The first portion 42 of the second side panel 40 further includes an upper edge 50A and a lower edge 51A (FIG. 2). Similarly, the second portion 44 of the second side panel 40 includes an inner edge 48B and an outer edge 49B. The second portion 44 of the second side panel 40 further includes an upper edge 50B and a lower edge 51B (FIG. 2). As shown in FIG. 1, the articulating joint 46 positioned between the first and second portions 42, 44 of the second side panel 40 is disposed along the respective inner edges 48A, 48B of the first and second portions 42, 44 of the second side panel 40. The first portion 42 of the first side panel 20 is contemplated to be pivotally coupled to the inner surface 12A of the front panel 12 at an articulating joint 52 (FIG. 2) that is disposed along the outer edge 49A of the first portion 42 of the second side panel 40.

As noted above, and best illustrated in FIG. 2, the rear panel 14 includes first and second ends 19A, 19B, which are opposed ends relative to one another. The first end 19A of the rear panel 14 is pivotally coupled to the second portion 24 of the first side panel 20 along an articulating joint 60 disposed along the outer edge 29B of the second portion 24 of the first side panel 20. Similarly, the second end 19B of the rear panel 14 is pivotally coupled to the second portion 44 of the second side panel 40 along an articulating joint 62 disposed along the outer edge 49B of the second portion 44 of the second side panel 40. In this way, the second portion 24 of the first side panel 20 and the second portion 44 of the second side panel 40 are operably coupled to the inner surface 14A of the rear panel 14.

Referring now to FIGS. 1 and 2, the storage compartment 10 further includes a compartment panel 90 having a first portion 91. As best shown in FIG. 2, the first portion 91 of the compartment panel 90 is pivotally coupled to a second portion 92 of the compartment panel 90 along an articulating joint 95 disposed therebetween. The second portion 92 of the compartment panel 90 is further pivotally coupled to a third portion 94 of the compartment panel 90 at an articulating joint 96 disposed therebetween. As further shown in FIG. 2, the first portion 91 of the compartment panel 90 is further pivotally coupled to the inner surface 12A of the front panel 12 at an articulating joint 94. The compartment panel 90 is operable between a stowed position (FIG. 3), an extended position (FIGS. 4B, 4C, 5B, 5C) and a contoured use position (FIGS. 1, 2, 4D, 5D). The third portion 93 of the compartment panel 90 includes a distal end 98 that is a free end configured to be operably coupled to the inner surface 12A of the front panel 12 when the compartment panel 90 is in the contoured use position to define the latch housing 99 positioned between the inner surface 12A of the front panel 12 and the compartment panel 90. As further shown in FIG. 2, the latch housing 99 is closed off at opposite ends thereof by the first portions 22, 42 of the first and second side panels 20, 40, respectively. In use, the latch housing 99 is configured to receive a latch mechanism therein, wherein the latch mechanism is operably coupled to a handle assembly disposed in the access aperture 13 of the front panel 12. The latch mechanism is contemplated to latch the storage compartment 10 in a closed position within a vehicle interior. The handle assembly is linked to the latch mechanism as housed within the latch housing 99 to provide an exteriorly accessible means to selectively release the latch mechanism as desired by a user.

With specific reference to FIG. 2, a bottom panel 70 having first and second portions 72, 74 is shown. The first and second portions 72, 74 of the bottom panel 70 are interconnected along an articulating joint 76. The first portion 72 of the bottom panel 70 is pivotally coupled to the inner surface 12A of the front panel 12 along an articulating joint 82. The second portion 74 of the bottom panel 70 is operably coupled to the lower edge 18 of the rear panel 14 along an articulating joint 84. Thus, the bottom panel 70, much like the first and second side panels 20, 40, is a foldable panel that is operable between folded and extended positions. In FIGS. 1 and 2, the bottom panel 70 is shown in the extended position.

Figure 3:
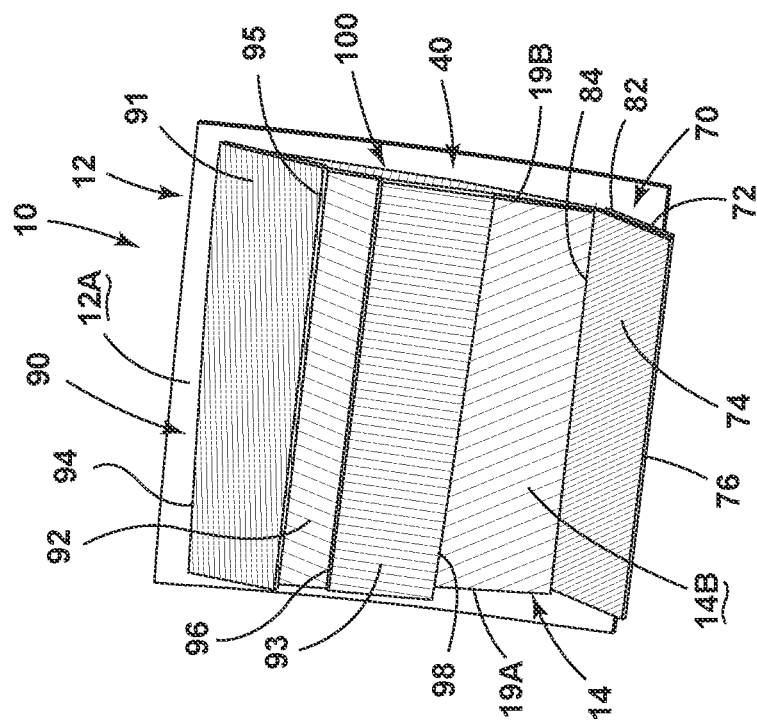
FIG. 3 is a rear top perspective view of the storage compartment of FIG. 2 with the interior vessel in a retracted condition.

As further shown in FIGS. 1 and 2, the front panel 12, the first and second side panels 20, 40, the rear panel 14 and the bottom panel 70 of storage compartment 10 cooperate to define an interior vessel 100. The foldable nature of the first and second side panels 20, 40 and the bottom panel 70 of storage compartment 10 make for an interior vessel 100 that is operable between retracted and deployed conditions. In FIGS. 1 and 2, the interior vessel 100 is shown in the deployed condition. In FIG. 3, the interior vessel 100 is shown in the retracted condition. In FIGS. 2 and 3, the panels of the storage compartment 10 are shown with diagonal lines used to identify the respective panels with the interior vessel 100 in the deployed condition (FIG. 2) and in the retracted condition (FIG. 3).

As identified above, the storage compartment 10 of the present concept includes a number of articulating joints 26, 32, 46, 52, 60, 62, 76, 82, 84, 94, 95 and 96 that provide for the folding of the interior vessel 100 between the retracted and deployed conditions. As used herein, the term "articulating joint" describes an intersection or seem disposed between adjacent articles that allows for the articles to pivot relative to one another. By way of example, the term "articulating joint" may refer to a flexible material that is printed between rigid components comprised of rigid material of the storage compartment 10, or may refer to thinned out portions of a common material used to print both the joint and the adjacent articles to create a flexible interconnection therebetween.

Figure 4A:
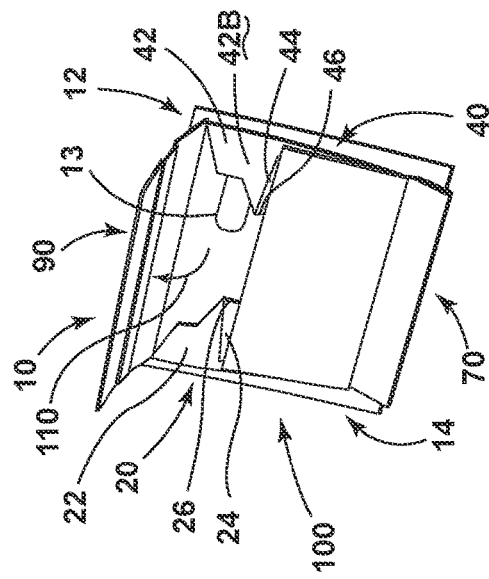
FIGS. 4A-4D are top perspective views showing relative movement of the interior vessel of the storage compartment of FIG. 3 moving from the retracted condition to the deployed condition.
Figure 4B:
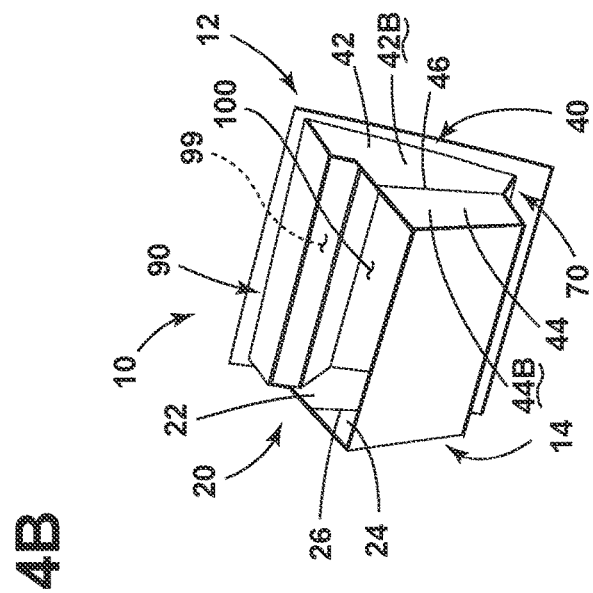
Figure 4C:
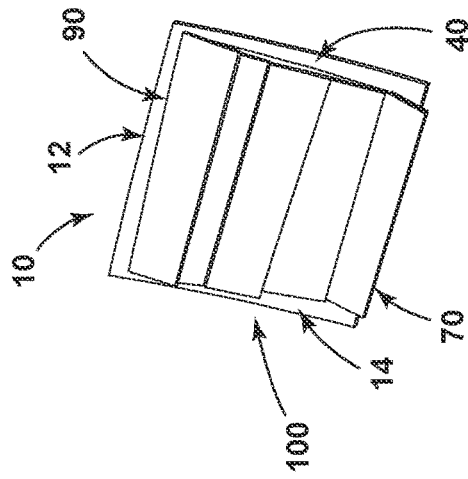
Figure 4D:
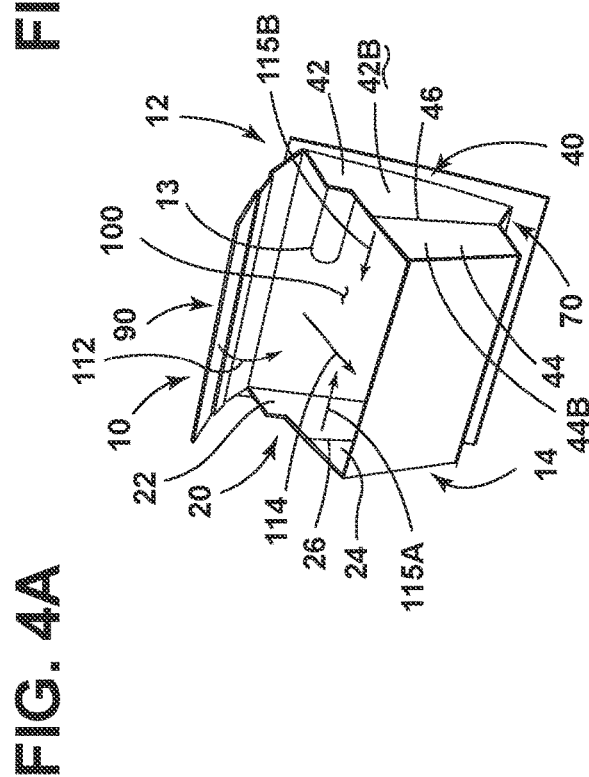

Specifically, articulating joints 26, 32 and 60 are contemplated to be flexible joints associated with the first side panel 20 and provide for the articulation of the first side panel 20 between the folded and extended positions as shown in FIGS. 4B and 4D. Articulating joints 46, 52 and 62 are contemplated to be flexible joints associated with the second side panel 40 and provide for the articulation of the second side panel 40 between the folded and extended positions as shown in FIGS. 4B and 4D. The articulating joints 26, 32, 60 and 46, 52, 62 are substantially vertically disposed joints, that allow for the first and second side panels 20, 40 to fold inwardly into the interior vessel 100 to the folded position from the extended position as best shown in FIG. 4B.

Articulating joints 94, 95 and 96 are contemplated to be flexible joints associated with the compartment panel 90 and provide for the articulation of the compartment panel 90 between the folded position, the extended position and the contoured use position as shown in FIGS. 4A, 4B, and 4D, respectively. Articulating joints 76, 82 and 84 are contemplated to be flexible joints associated with the bottom panel 70 and provide for the articulation of the bottom panel 70 between the folded position and the extended position as shown in FIGS. 4A and 4D, respectively. The articulating joints 76, 82, 84 and 94, 95, 96 are substantially horizontally disposed joints, that allow for the bottom panel 70 and the compartment panel 90 to move upward and downward between the folded and extended positions, as well as the contoured use position of the compartment panel 90.

As noted above, the component parts of the storage compartment 10 are contemplated to be manufactured using an additive manufacturing technique to provide for a unitary part having the folding capabilities outlined above. Thus, the first and second side panels 20, 40 are pivotally coupled to the inner surface 12A of the front panel 12 at articulating joints 32, 52, respectively. The bottom panel 70 is pivotally coupled to the inner surface 12A of the front panel 12 at articulating joint 82, and the compartment panel 90 is pivotally coupled to the inner surface 12A of the front panel 12 at articulating joint 94. Further, the front and rear panels 12, 14 are interconnected at respective inner surfaces 12A, 14A thereof by the first and second side panels 20, 40.

Movement of the interior vessel 100 between the retracted and deployed conditions will now be described with reference to FIGS. 4A-5D.

Figure 5A:
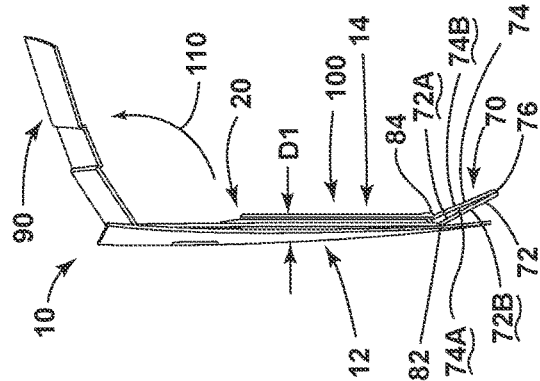
FIGS. 5A-5D are side elevation views of the unfolding storage compartment of FIGS. 4A-4D.
Figure 5B:
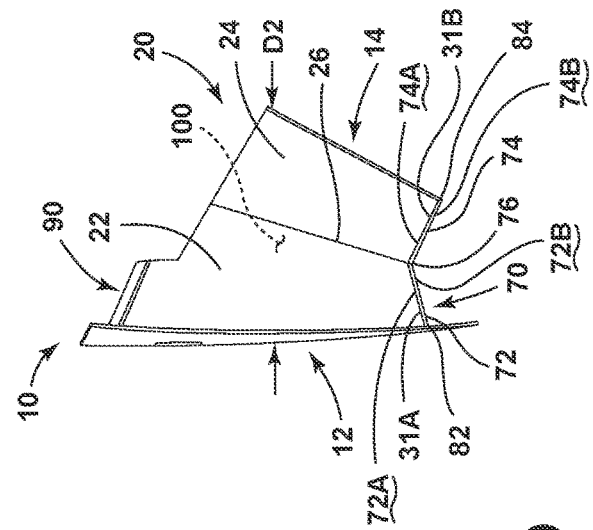
Figure 5C:
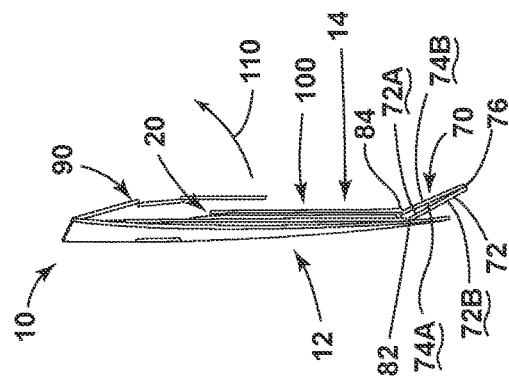
Figure 5D:
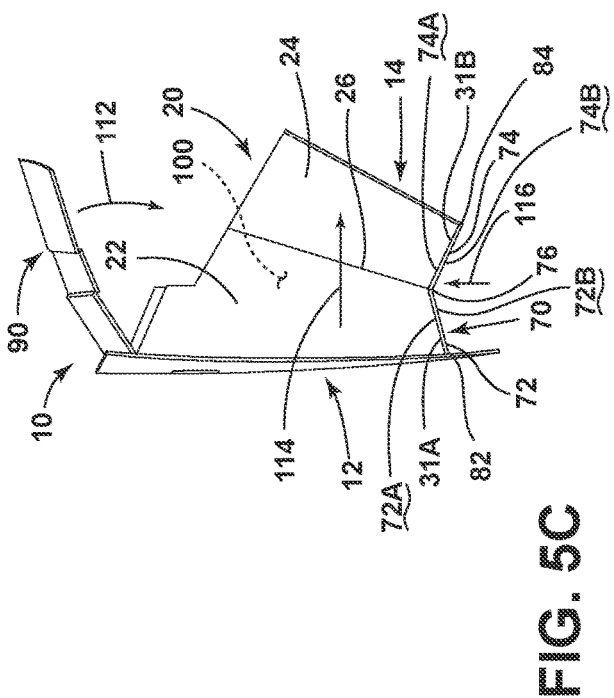

With specific reference to FIGS. 4A and 5A, the storage compartment 10 is shown with the interior vessel 100 in the retracted condition. With the interior vessel 100 in the retracted condition, the storage compartment 10 occupies a much lesser volume of space as compared to the interior vessel 100 positioned in the deployed condition, as shown in FIGS. 1, 2, 4D and 5D. As specifically indicated in FIG. 5B, the front panel 12 and the rear panel 14 are spaced-apart from one another a first distance D1 when the interior vessel 100 is in the retracted condition. With specific reference to FIG. 5D, the front panel 12 and the rear panel 14 are spaced-apart from one another a second distance D2 when the interior vessel 100 is in the deployed condition. As shown in FIGS. 5B and 5D, the second distance D2 is greater than the first distance D1, as the rear panel 14 moves away from the front panel 12 as the interior vessel 100 moves from the retracted condition to the deployed condition. In moving the interior vessel 100 of the storage compartment 10 from the retracted condition to the deployed condition, a number of movements are required at the articulating joints 26, 32, 46, 52, 60, 62, 76, 82, 84, 94, 95 and 96 described above. As specifically shown in FIGS. 4A and 5A, the compartment panel 90 is positioned in a stowed position with the interior vessel 100 in the retracted condition. In the stowed position, the compartment panel 90 is compressed against the retracted interior vessel 100 to provide an overall slim profile for the storage compartment 10. Similarly, the bottom panel 70 is shown in a folded position when the interior vessel 100 is in the retracted condition. As specifically shown in FIG. 4B, the first and second side panels 20, 40 are in folded positions when the interior vessel 100 is in the retracted condition. In the folded positions, the first and second side panels 20, 40 are covered by the compartment panel 90, when the compartment panel 90 is in the stowed position, as shown in FIGS. 4A and 5A.

As specifically shown in FIGS. 4B and 5B, the compartment panel 90 is in the extended position. With the compartment panel 90 in the extended position, the folded first and second side panels 20, 40 are revealed. In moving from the stowed position (FIGS. 4A and 5A) to the extended position (FIGS. 4B and 5B), the compartment panel 90 moves upward in the path as indicated by arrow 110. Specifically, the compartment panel 90 pivots upwardly from the articulating joint 94 interconnecting the compartment panel 90 with the inner surface 12A of the front panel 12 as the compartment panel 90 moves from the stowed position to the extended position along the path as indicated by arrow 110. With the compartment panel 90 in the extended position, the folded first and second side panels 20, 40 can move from the folded positions (FIGS. 4B and 5B) to the extended positions (FIGS. 4C and 5C) in the outward direction away from the inner surface 12A of the front panel 12, as indicated by arrow 116. With the first and second side panels 20, 40 in the extended positions (FIGS. 4C and 5C), the interior vessel 100 is now in the deployed condition.

Specific movement of the first and second side panels 20, 40 will now be discussed. As shown in FIG. 4B, the first and second side panels 20, 40 are inwardly folded when the interior vessel 100 is in the retracted condition. The first and second side panels 20, 40 move from the folded positions to the extended positions by the articulation of the respective first and second portions 22, 24 and 42, 44 of the first and second side panels 20, 40, as provided by the associated articulating joints. With specific reference to the second side panel 40, the second side panel 40 is shown in the inwardly folded position in FIG. 4B. As the first and second portions 42, 44 of the second side panel 40 pivot outwardly from the folded position towards the extended position, the first portion 42 pivots at the articulating joint 52 disposed between the first portion 42 and the inner surface 12A of the front panel 12. Similarly, the second portion 44 of the second side panel 40 pivots at the articulating joint 62 disposed between the second portion 44 and the rear panel 14. Further, the first and second portions 42, 44 of the second side panel 40 pivot with respect to one another at the articulating joint 26 interconnecting the first and second portions 42, 44 of the second side panel 40. Similar articulation is provided by the first side panel 20 with respect to the first and second portions 22, 24 thereof and the articulating joints 32, 60 and 26 associated therewith. Thus, with reference to FIG. 4C, when the compartment panel 90 is in the extended position, and the first and second side panels 20, 40 are in the extended positions, the first and second side panels 20, 40 can be moved to the folded positions by moving the first and second portions 22, 24 and 42, 44 of the first and second side panels 20, 40 inwardly in the directions as indicated by arrows 115A, 115B. In this way, the outer surfaces 22B, 24B and 42B, 44B of the first and second portions 22, 24 and 42, 44 of the first and second side panels 20, 40 abut one another when the first and second side panels 20, 40 are in the inwardly folded positions.

By having the first and second portions 22, 24 and 42, 44 of the first and second side panels 20, 40 fold inwardly, as shown in FIG. 4B, the first and second side panels 20, 40 state within the dimensional bounds of the front panel 12. If the first and second portions 22, 24 and 42, 44 of the first and second side panels 20, 40 were twofold outwardly, it is contemplated that the first and second side panels 20, 40 would be outside the bounds of the front panel 12 with the first and second side panels 20, 40 in an outwardly folded position. Having a storage compartment 10 that is packaged within the dimensional bounds of the front panel 12 makes for an efficient use of build box volume in an additive manufacturing procedure, as further described below.

With further reference to FIG. 4C, the compartment panel 90 can be moved from the extended position to the contoured use position (FIG. 4D) when the first and second panels 20, 40 are in the extended positions, by pivoting the compartment panel 90 downward along the path as indicated by arrow 112. Specifically, the compartment panel 90 pivots downwardly from the articulating joint 94 interconnecting the compartment panel 90 with the inner surface 12A of the front panel 12 as the compartment panel 90 moves from the extended position to the contoured use position along the path as indicated by arrow 112. This movement of the compartment panel 90 is further shown in FIGS. 5A-5D. In this way, the portions 91-93 of the compartment panel 90 contour or otherwise flex at the interconnecting articulating joints 95, 96 to create the structural configuration of the latch housing 99. As noted above, the latch housing 99 is cooperatively defined by the inner surface 12A of the front panel 12, the inner surfaces 22A, 42A of the first portions 22, 42 of the first and second side panels 20, 40, and the compartment panel 90 when the compartment panel 90 is in the contoured use position. The abutting relationship between the opposed sides of the compartment panel 90 and the inner surfaces 22A, 42A of the first portions 22, 42 of the first and second side panels 20, 40 prevents the first and second side panels 20, 40 from moving to the inwardly folded positions from the extended positions.

Referring now to FIG. 5B, the compartment panel 90 is shown in the extended position, while the interior vessel 100 is shown in the retracted condition. As noted above, with the interior vessel 100 in the retracted condition, the front panel 12 and rear panel 14 are spaced-apart the first distance D1. As shown, the first and second portions 72, 74 of the bottom panel 70 each include inner surfaces 72A, 74A and outer surfaces 72B, 74B, respectively. The bottom panel 70 is shown in the folded position, with respective inner surfaces 72A, 74A of the first and second portions 72, 74 of the bottom panel 70 positioned adjacent to one another. In this way, the bottom panel 70 can be considered to be outwardly folded when in the folded position. As the first and second side panels 20, 40 move from the folded position to the extended position along the path as indicated by arrow 114 (FIG. 5C), the bottom panel 70 moves upward in the direction as indicated by arrow 116. Specifically, the bottom panel 70 moves from the folded position (FIGS. 5A, 5B) to the extended position (FIGS. 5C, 5D) by the articulation of the first and second portions 72, 74 of the bottom panel 70, as provided by the associated articulating joints. The bottom panel 70 is shown in the outwardly folded position in FIG. 5B. As the first and second side panels 20, 40 move towards the extended positions, the first portion 72 of the bottom panel 70 pivots at the articulating joint 82 disposed between the first portion 72 of the bottom panel 70 and the inner surface 12A of the front panel 12. Similarly, the second portion 74 of the bottom panel 70 pivots at the articulating joint 84 disposed between the second portion 74 of the bottom panel 70 and the rear panel 14. Further, the first and second portions 72, 74 of the bottom panel 70 pivot with respect to one another at the articulating joint 76 interconnecting the first and second portions 72, 74 of the bottom panel 70. In this way, the first and second portions 72, 74 of the bottom panel 70 pivot upward in the direction as indicated by arrow 116 from an outwardly folded position towards a slightly inwardly folded position, when the bottom panel 70 moves to the extended position. As best shown in embodiment of FIGS. 5C and 5D, the inner surfaces 72A, 74A of the first and second portions 72, 74 of the bottom panel 70 respectively abut the lower edges 31A, 31B of the first and second portions 22, 24 of the first side panel 20. A similar configuration is contemplated for the arrangement of the bottom panel 70 and the second side panel 40 on the opposite side of the interior vessel 100.

Figure 6A:
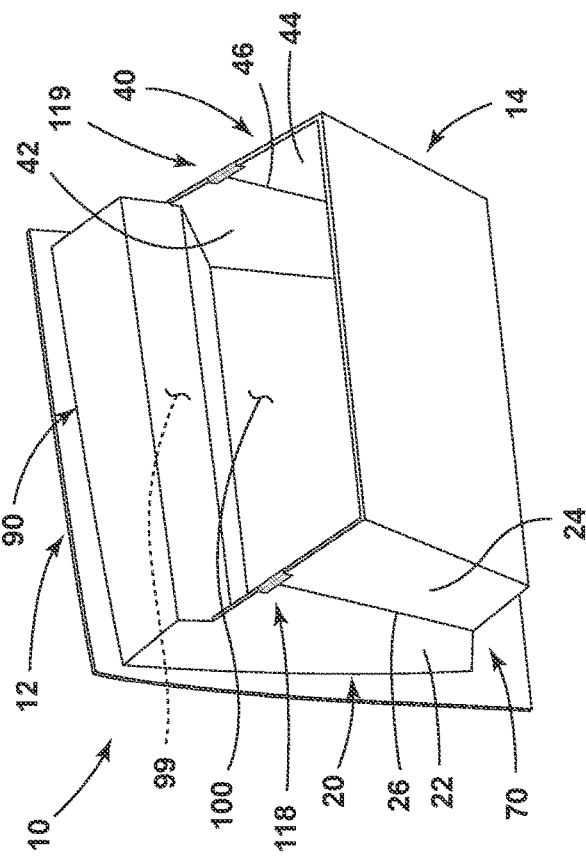
FIG. 6A is a rear top perspective view of the storage compartment of FIG. 1 having clip members in disengaged positions on side panels of the storage compartment.
Figure 6B:
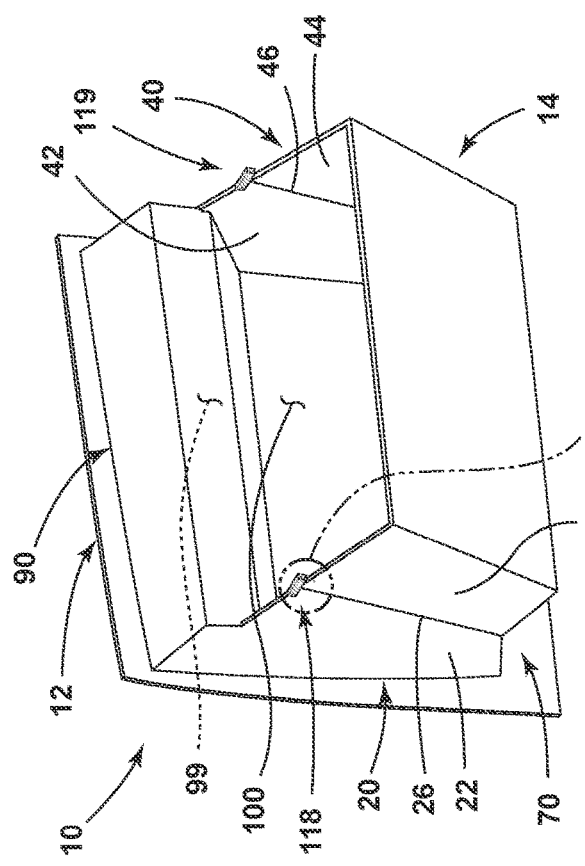
FIG. 6B is a rear top perspective view of the storage compartment of FIG. 6A with the clip members in engaged positions.
Figure 6D:
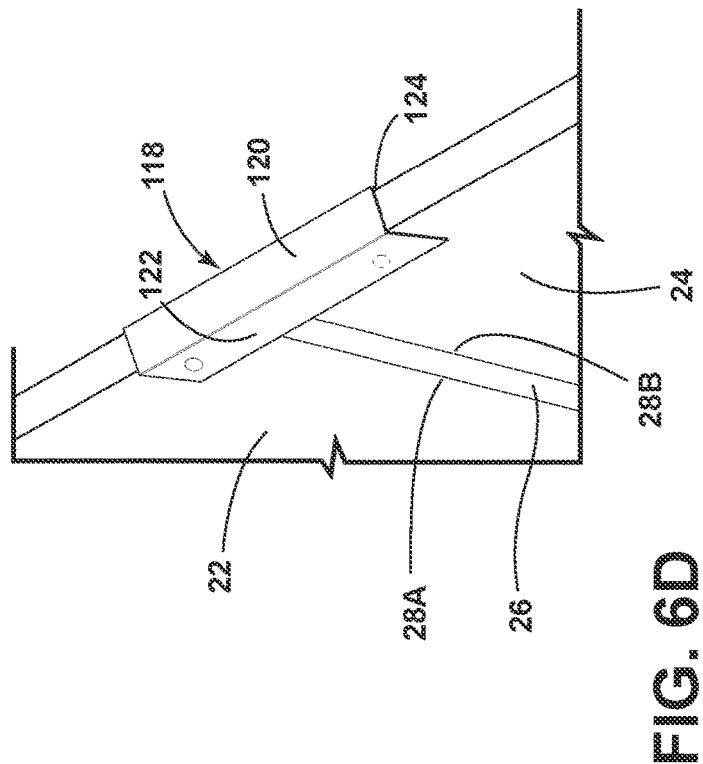
FIG. 6D is a zoomed-in view of the storage compartment of FIG. 6B taken at location VID.
Figure 6C:
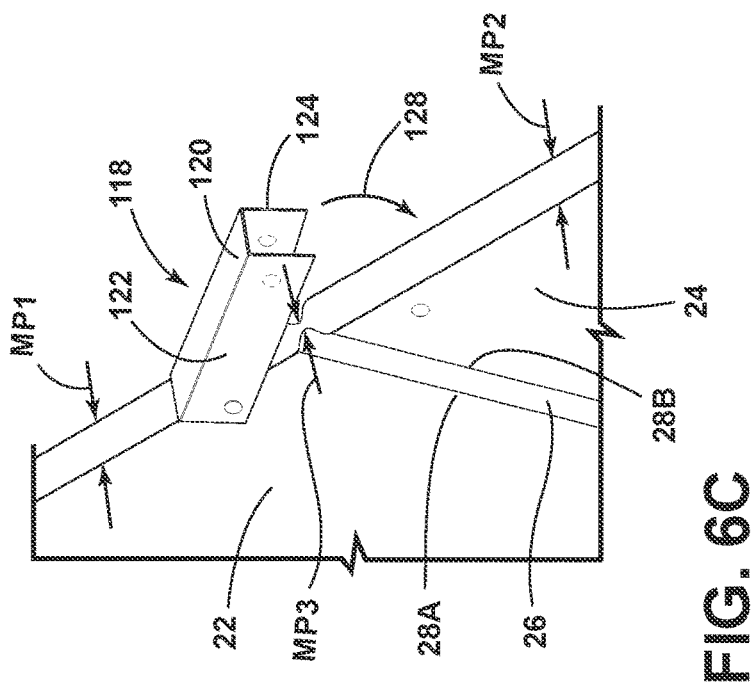
FIG. 6C is a zoomed-in view of the storage compartment of FIG. 6A taken at location VIC.

Referring now to FIG. 6A, the storage compartment 10 is shown with clip members 118, 119 positioned on the first and second side panels 20, 40, respectively, of the storage compartment 10. The clip members 118, 119 are essentially identical members, such that the description of clip member 118 will adequately describe clip member 119. As shown in FIGS. 6A and 6C, clip member 118 includes an inverted U-shaped body portion 120 having first and second portions 122, 124. The first portion 122 of the clip member 118 is shown in FIGS. 6A and 6C as being operably coupled to the first portion 22 of the first side panel 20. Specifically, the first portion 122 of the clip member 118 is shown in FIGS. 6A and 6C as being pivotally coupled to the first portion 22 of the first side panel 20, such that the clip member 118 is operable between engaged and disengaged positions. With specific reference to FIG. 6C, the clip member 118 is shown in the disengaged position, with the second portion 124 shown disengaged with the second portion 24 of the first side panel 20. With specific reference to FIGS. 6B and 6D, the clip member 118 is shown in the engaged position, with the second portion 124 shown operably coupled with the second portion 24 of the first side panel 20. Thus, the second portion 124 of the clip member 118 is releasably coupled to the second portion 24 of the first side panel 20. In the engaged position, as specifically shown in FIG. 6D, the body portion 120 of the clip member 118 covers a portion of the articulating joint 26 between the first and second portions 22, 24 of the first side panel 20. In moving from the disengaged position to the engaged position, the clip member 118 will rotate or pivot in the downward direction as indicated by arrow 128 in FIG. 6C. The inverted U-shaped configuration of the clip member 118 allows the clip member 118 to couple to the first side panel 20 along the upper edges 30A, 30B of the first and second portions 22, 24 of the first side panel 20. By coupling to the first and second portions 22, 24 of the first side panel 20, and by covering a portion of the articulating joint 26 positioned between the first and second portions 22, 24 of the first side panel 20, the clip member 118 serves to brace the first side panel 20 in the extended position, which further serves to retain the interior vessel 100 in the deployed condition. Specifically, the clip member 118 inhibits the ability of the first side panel 20 to move to the inwardly folded position when the clip member 118 is in the engaged position. With reference to FIG. 6B, the clip members 118, 119 positioned in the engaged positions on the first and second side panels 20, 40, respectively, of the storage compartment 10 to retain the interior vessel 100 thereof in the deployed condition.

With specific reference to FIG. 6C, the articulating joint 26 is shown as being disposed between the first and second portions 22, 24 of the first side panel 20. In the embodiment shown in FIG. 6C, the articulating joint 26 is defined by a thinner material profile MP3 as compared to material profiles MP1, MP2 of the first and second portions 22, 24 of the first side panel 20. As noted above, the first and second portions 22, 24 of the first side panel 20 are contemplated to be comprised of a rigid material. Thus, the articulating joint 26 can either have a thinned material profile MP3, as shown in FIG. 6C, or be defined by a strip of flexible material that is printed between the first and second portions 22, 24 of the first side panel 20 at the inner edges 28A, 28B thereof, to interconnect the same in a pivoting manner.

Figure 6E:
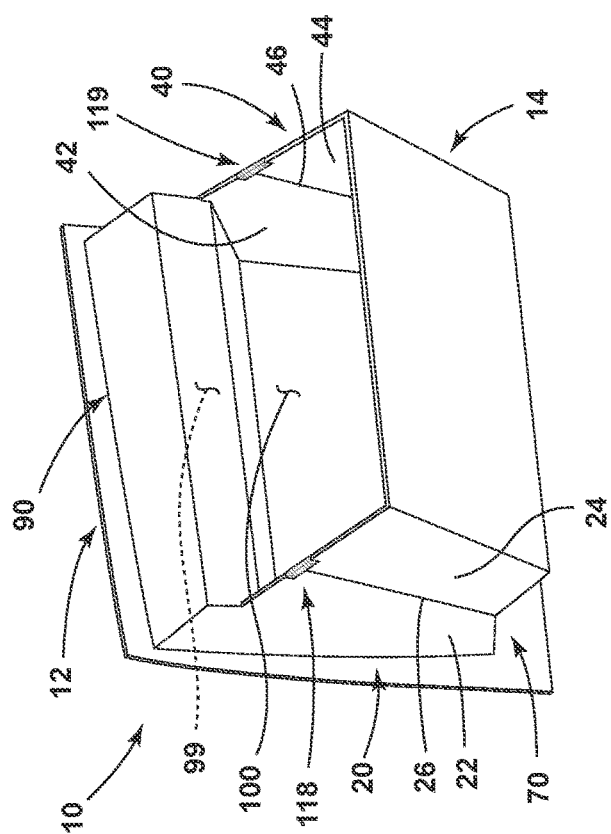
FIG. 6E is a rear top perspective view of the storage compartment of FIG. 1 having clip members exploded away from side panels of the storage compartment.
Figure 6F:
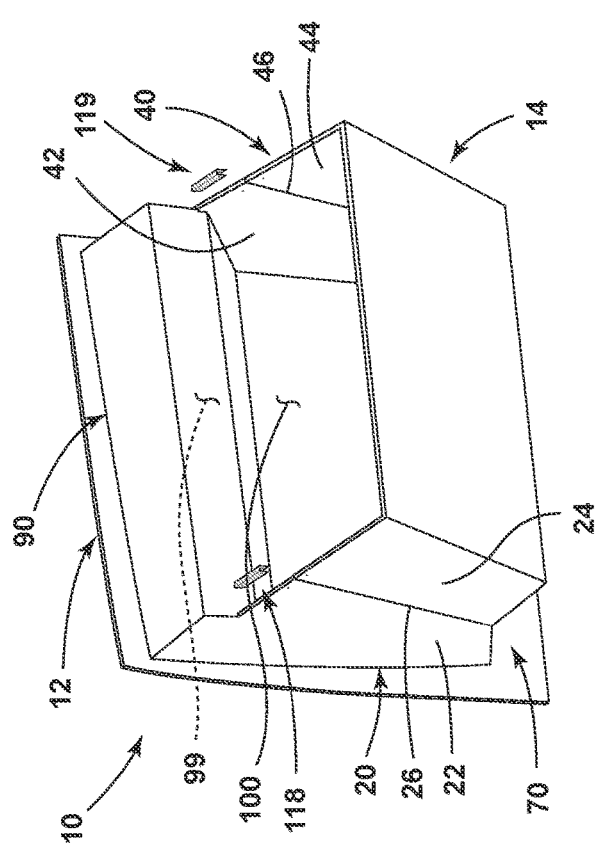
FIG. 6F is a rear top perspective view of the storage compartment of FIG. 6C with the clip members in engaged positions.

With reference to FIGS. 6E and 6F, the clip members 118, 119 can be independent members that are set in place along the upper edges 30A, 30B of the first and second portions 22, 24 of the first side panel 20, and the upper edges 50A, 50B of the first and second portions 42, 44 of the second side panel 40. In this way, the clip members 118, 119 can be releasably coupled to the first and second side panels 20, 40.

Figure 7C:
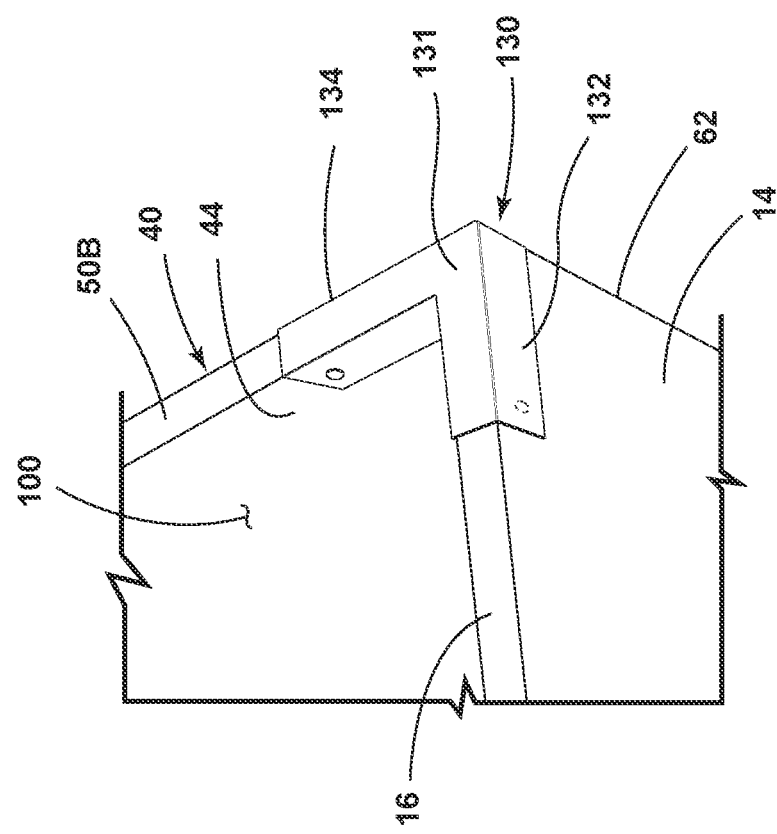
FIG. 7C is a zoomed-in view of the storage compartment of FIG. 7B taken at location VIIC.

Referring now to FIG. 7A, another set of clip members 129, 130 is shown. The clip members 129, 130 are essentially identical members, such that the description of clip member 130 will adequately describe clip member 129 as well. As illustrated, clip member 130 includes a body portion 131 with a first portion 132 and a second portion 134. The second portion 134 extends orthogonally from the first portion 132. In FIG. 7C, the first portion 132 of the clip member 130 is shown as being operably coupled to the upper edge 16 of the rear panel 14. It is contemplated that the clip member 130 may be pivotally coupled to the rear panel 14. As further shown in FIG. 7C, the second portion 134 of the clip member 130 is shown as being operably coupled to the upper edge 50B of the second portion 44 of the second side panel 40. It is contemplated that the clip member 130 may be pivotally coupled to the rear panel 14 at the first portion 132 thereof, or may be pivotally coupled to second portion 44 of the second side panel 40 at the second portion 134 thereof. With specific reference to FIG. 7A, the clip member 130 is shown in the disengaged position, with the second portion 134 shown disengaged with the second portion 44 of the second side panel 40. With specific reference to FIGS. 7B and 7C, the clip member 130 is shown in the engaged position, with the second portion 134 shown operably coupled with the second portion 44 of the second side panel 40. In the engaged position, as specifically shown in FIG. 7C, the body portion 131 of the clip member 130 covers a portion of the articulating joint 62 disposed between the second portion 44 of the second side panel 40 and the rear panel 14. Either the first portion 132, the second portion 134, or both may have an inverted U-shaped configuration that retains the second side panel 40 and the rear panel 14 from flexing at the articulating joint 62 disposed therebetween.

With respect to the various clip members 118, 119, 129 and 130 noted above, it is contemplated that they may be used together to retain the interior vessel 100 in the deployed condition, or select clip members may be used. The clip members 118, 119, 129 and 130 can be printed such that they are tethered to a panel of the storage compartment 10 by a piece of flexible material, or may be pivotally coupled to a panel of the storage compartment 10, as described above. Thus, it is contemplated that the clip members 118, 119, 129 and 130 can be part of the unitary whole of the storage compartment.

Figure 8A:
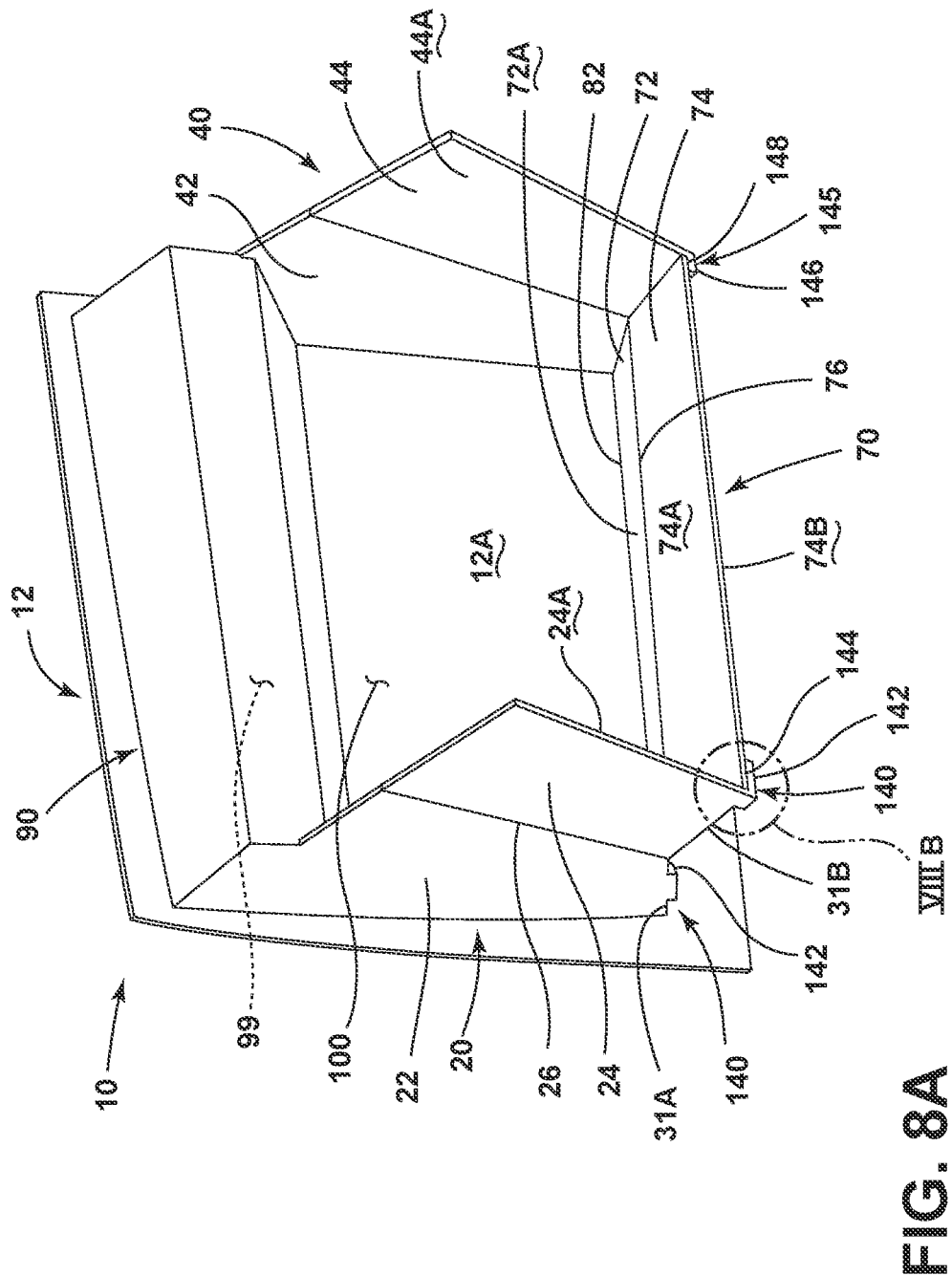
FIG. 8A is a rear top perspective view of the storage compartment of FIG. 1 with a rear panel removed to reveal support tabs on side panels of the storage compartment.

Referring now to FIG. 8A, the first side panel 20 and the second side panel 40 are shown having inwardly extending support tabs 140, 145, respectively. Specifically, two support tabs 140 are shown on the first and second portions 22, 24 of the first side panel 20, respectively. The two support tabs 140 are contemplated to inwardly extend from the inner surfaces 22A, 24A of the first and second portions 22, 24 of the first side panel 20, respectively. Support tab 145 is shown as having a ledge 146 with an upper surface 148. As shown in FIG. 8A, the outer surface 74B of the bottom panel 70 is supported on the upper surface 148 of the ledge 146 of the support tab 145.

Figure 8B:
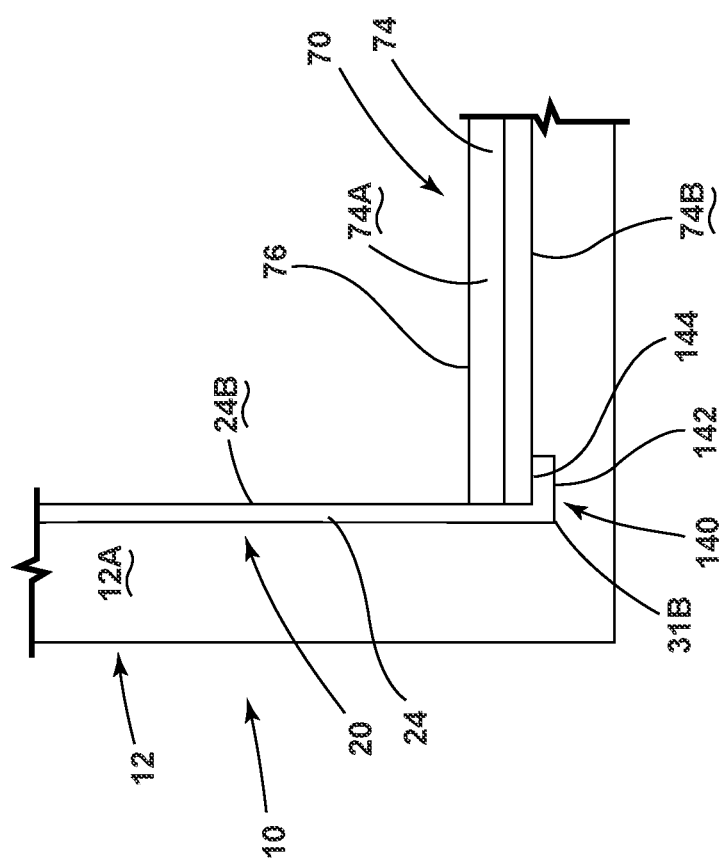
FIG. 8B is a zoomed-in view of the storage compartment of FIG. 8A taken at location VIIIB.

As best shown in FIG. 8B, support tab 140 is shown as having a ledge 142 with an upper surface 144, wherein the outer surface 74B of the bottom panel 70 is supported on the upper surface 144 of the ledge 142 of the support tab 140. It is contemplated that the support tab 140 disposed on the first portion 22 of the first side panel 20 supports the outer surface 72B of the first portion 72 of the bottom panel 70 in a abutting relationship. Thus, the outer surfaces 72B, 74B of the first and second portions 72, 74 of the bottom panel 70 abut the upper surfaces 144, 148 of the respective support tabs 140, 145 when the interior vessel 100 is in the deployed condition. It is contemplated that any number of support tabs may be used to support the bottom panel 70 when the interior vessel 100 is in the deployed condition.

Figure 9B:
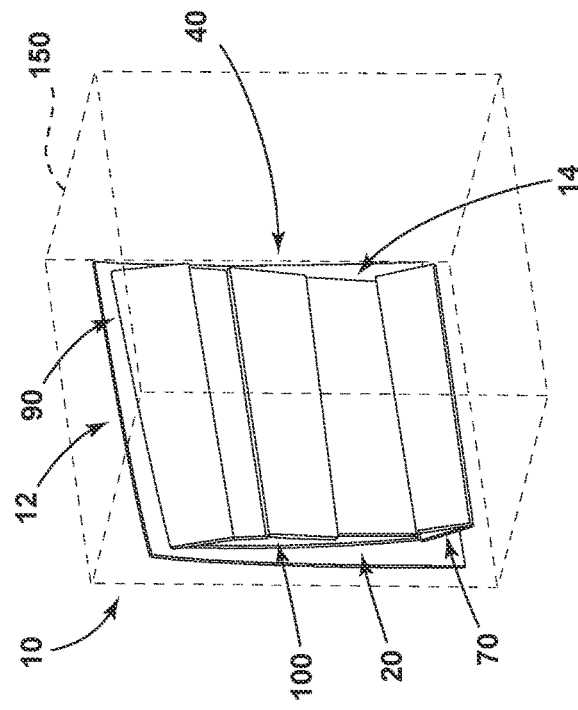
FIG. 9B is a top perspective view of the storage compartment of FIG. 9A positioned within the build box with the interior vessel of the storage compartment in a retracted condition.
Figure 9A:
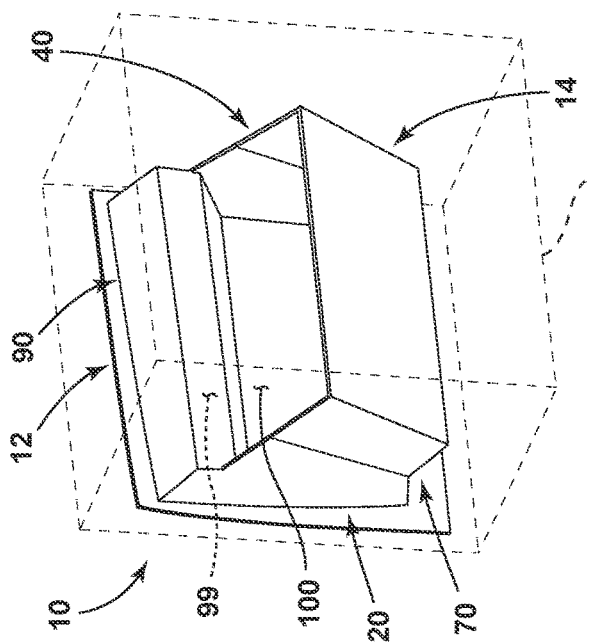
FIG. 9A is a top perspective view of the storage compartment of FIG. 1 positioned within a build box shown in phantom, with an interior vessel of the storage compartment in a deployed condition.
Figure 9C:
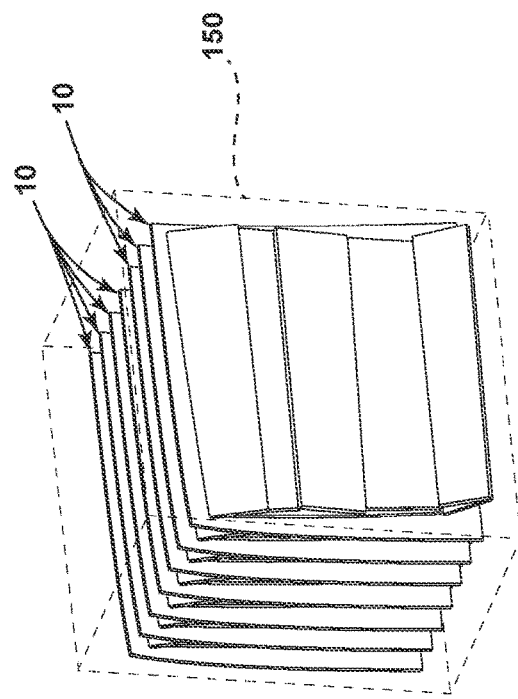
FIG. 9C is a top perspective view of multiple storage compartments with interior vessels retracted conditions positioned within the build box.

Referring now to FIG. 9A, the storage compartment 10 is shown disposed within the parameters of a build box 150. The build box 150 is illustrated in FIGS. 9A-9C as an area of specific volume that can be utilized by an additive manufacturing device to additively manufactured or print a three-dimensional (3D) object, such as the storage compartment 10. As the dimensions of the build box 150 are limited, it is important that the volume provided by the build box 150 is efficiently utilized. As noted above, the storage compartment 10 includes the interior vessel 100 that is operable between deployed and retracted conditions. As specifically illustrated in FIG. 9A, the storage compartment 10 is shown with the interior vessel 100 in the deployed condition. In the deployed condition, the interior vessel 100 takes up a large amount of volume within the build box 150. This is generally due to the distance D2 (FIG. 5D) between the front panel 12 and the rear panel 14 when the interior vessel 100 is in the deployed condition, as described above with reference to FIGS. 4A-5D. With reference to FIG. 9B, the storage compartment 10 is shown with the interior vessel 100 in the retracted condition. In the retracted condition, the interior vessel 100 takes up much less volume within the build box 150, as compared to the interior vessel 100 in the deployed condition (FIG. 9A). This is generally due to the distance D1 (FIG. 5B) between the front panel 12 and the rear panel 14 when the interior vessel 100 is in the retracted condition, as described above with reference to FIGS. 4A-5D. As such, multiple storage compartments 10 can be printed in a single additive manufacturing procedure within the build box 150, when the storage compartments 10 are printed with the interior vessel 100 in the retracted condition, as best shown in FIG. 9C. For example, a single storage compartment 10 can be printed with the interior vessel 100 in the deployed condition, as shown in FIG. 9A. However, the same storage compartment 10 can be printed in multiples when the interior vessel 100 is printed in the retracted condition, as shown in FIG. 9C. The exemplary embodiment shown in FIG. 9C includes seven storage compartments 10 printed within the build box 150. It is contemplated that more or fewer storage compartments can be printed within a single build box, given the specific dimensions of the build box of the particular additive manufacturing device used.

According to a first aspect of the present disclosure, a storage compartment includes a front panel having an inner surface. A first side panel includes first and second portions. The first portion of the first side panel is pivotally coupled to the inner surface of the front panel. The second portion of the first side panel is pivotally coupled to the first portion of the first side panel. A second side panel is spaced-apart from the first side panel and includes first and second portions. The first portion of the second side panel is pivotally coupled to the inner surface of the front panel. The second portion of the second side panel is pivotally coupled to the first portion of the second side panel. A rear panel includes first and second ends. The first end is pivotally coupled to the second portion of the first side panel. The second end is pivotally coupled to the second portion of the second side panel.

Embodiments of the first aspect of the present disclosure can include any one or a combination of the following features:
  a bottom panel includes first and second portions pivotally coupled to one another. The first portion of the bottom panel is pivotally coupled to the inner surface of the front panel;
  a compartment panel includes a first portion pivotally coupled to a second portion of the compartment panel, and a third portion pivotally coupled to the second portion of the compartment panel;
  the first portion of the compartment panel is pivotally coupled to the inner surface of the front panel; and
  the third portion of the compartment panel includes a distal end operably coupled to the inner surface of the front panel to define a latch housing positioned between the inner surface of the front panel and the compartment panel.

According to a second aspect of the present disclosure, a glovebox for a vehicle includes front and rear panels interconnected at respective inner surfaces thereof by first and second folding side panels. The front and rear panels and the first and second folding side panels cooperate to define an interior vessel. The interior vessel is operable between deployed and retracted conditions. The front and rear panels are spaced-apart from one another a first distance when the interior vessel is in the retracted condition. The front and rear panels are spaced-apart from one another a second distance that is greater than the first distance when the interior vessel is in the deployed condition.

Embodiments of the second aspect of the present disclosure can include any one or a combination of the following features:

the first and second folding side panels each include first and second portions pivotally coupled to one another along respective articulating joints disposed at inner edges of the first and second portions of the first and second folding side panels;

a clip member includes first and second portions. The first portion of the clip member is operably coupled to the first portion of the first folding side panel. The second portion of the clip member is operably coupled to the second portion of the first folding side panel;

the first clip member covers a portion of the articulating joint between the first and second portions of the first folding side member;

a bottom panel includes first and second portions pivotally coupled to one another. The first portion of the bottom panel is further pivotally coupled to the inner surface of the front panel;

an inner surface of one of the first and second portions of the first folding side panel includes an inwardly extending support tab. A outer surface of the bottom panel abuts an upper surface of the support tab when the interior vessel is in the deployed condition;

the rear panel is pivotally coupled to the second portions of the first and second folding side panels at outer edges of the second portions of the first and second folding side panels; and a clip member includes a first portion and a second portion extending orthogonally from the first portion. The first portion of the first clip member is operably coupled to the rear panel. The second portion of the first clip member is operably coupled to the second portion of the first folding side portion.

According to a third aspect of the present disclosure, a storage compartment includes a front panel having an inner surface. A first side panel include first and second portions interconnected along an articulating joint. The first portion of the first side panel is operably coupled to the inner surface of the front panel. A second side panel includes first and second portions interconnected along an articulating joint. The first portion of the second side panel is operably coupled to the inner surface of the front panel. The first and second side panels are operable between inwardly folded and extended positions. A bottom panel includes first and second portions interconnected along an articulating joint. The first portion of the bottom panel is operably coupled to the inner surface of the front panel. A rear panel includes first and second ends. The first end is pivotally coupled to the second portion of the first side panel along an articulating joint. The second end is pivotally coupled to the second portion of the second side panel along an articulating joint.

Embodiments of a third aspect of the present disclosure can include any one or a combination of the following features:

the articulating joint disposed between the first and second portions of the first side panel is defined by a thinner material profile as compared to material profiles of the first and second portions of the first side panel;

the first and second portions of the first side panel are comprised of a rigid material. The articulating joint disposed between the first and second portions of the first side panel is defined by a strip of flexible material interconnecting the first and second portions of the first side panel at inner edges thereof;

the front panel, the rear panel, the bottom panel and the first and second side panels are integrated to define a unitary whole;

the front panel, the rear panel, the bottom panel and the first and second side panels cooperate to define an interior vessel operable between deployed and retracted conditions;

one of the first side panel and the second side panel includes an inwardly extending support tab. A outer surface of the bottom panel abuts an upper surface of the support tab when the interior vessel is in the deployed condition; and a clip member having first and second portions, wherein the first portion of the clip member is pivotally coupled to the first portion of the first side panel along an upper edge thereof and the second portion of the clip member is releasably coupled to the second portion of the first side panel along an upper edge thereof. The clip member is positioned over the articulating joint disposed between the first and second portions of the first side panel.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A storage compartment, comprising:
a front panel having an inner surface;
a first side panel having first and second portions, wherein the first portion of the first side panel is pivotally coupled to the inner surface of the front panel, and further wherein the second portion of the first side panel is pivotally coupled to the first portion of the first side panel;
a second side panel spaced-apart from the first side panel and having first and second portions, wherein the first portion of the second side panel is pivotally coupled to the inner surface of the front panel, and further wherein the second portion of the second side panel is pivotally coupled to the first portion of the second side panel; and
a rear panel having first and second ends, wherein the first end is pivotally coupled to the second portion of the first side panel, and further wherein the second end is pivotally coupled to the second portion of the second side panel.

2. The storage compartment of claim 1, including:
a bottom panel having first and second portions pivotally coupled to one another, wherein the first portion of the bottom panel is further pivotally coupled to the inner surface of the front panel.

3. The storage compartment of claim 2, including:
a compartment panel having a first portion pivotally coupled to a second portion of the compartment panel, and a third portion pivotally coupled to the second portion of the compartment panel.

4. The storage compartment of claim 3, wherein the first portion of the compartment panel is further pivotally coupled to the inner surface of the front panel.

5. The storage compartment of claim 4, wherein the third portion of the compartment panel includes a distal end operably coupled to the inner surface of the front panel to define a latch housing positioned between the inner surface of the front panel and the compartment panel.

6. A glovebox for a vehicle, comprising:
front and rear panels interconnected at respective inner surfaces thereof by first and second folding side panels, wherein the front and rear panels and the first and second folding side panels cooperate to define an interior vessel, and further wherein the interior vessel is operable between deployed and retracted conditions, wherein the front and rear panels are spaced-apart from one another a first distance when the interior vessel is in the retracted condition, and further wherein the front and rear panels are spaced-apart from one another a second distance that is greater than the first distance when the interior vessel is in the deployed condition.

7. The glovebox of claim 6, wherein the first and second folding side panels each include first and second portions pivotally coupled to one another along respective articulating joints disposed at inner edges of the first and second portions of the first and second folding side panels.

8. The glovebox of claim 7, including:
a clip member having first and second portions, wherein the first portion of the clip member is operably coupled to the first portion of the first folding side panel, and further wherein the second portion of the clip member is operably coupled to the second portion of the first folding side panel.

9. The glovebox of claim 8, wherein the first clip member covers a portion of the articulating joint between the first and second portions of the first folding side panel.

10. The glovebox of claim 7, including:
a bottom panel having first and second portions pivotally coupled to one another, wherein the first portion of the bottom panel is further pivotally coupled to the inner surface of the front panel.

11. The glovebox of claim 10, wherein an inner surface of one of the first and second portions of the first folding side panel includes an inwardly extending support tab, and further wherein an outer surface of the bottom panel abuts an upper surface of the support tab when the interior vessel is in the deployed condition.

12. The glovebox of claim 7, wherein the rear panel is pivotally coupled to the second portions of the first and second folding side panels at outer edges of the second portions of the first and second folding side panels.

13. The glovebox of claim 12, including:
a clip member having a first portion and a second portion extending orthogonally from the first portion, wherein the first portion of the clip member is operably coupled to the rear panel, and further wherein the second portion of the clip member is operably coupled to the second portion of the first folding side panel.

14. A storage compartment, comprising:
a front panel having an inner surface;
a first side panel having first and second portions interconnected along an articulating joint, wherein the first portion of the first side panel is operably coupled to the inner surface of the front panel;
a second side panel having first and second portions interconnected along an articulating joint, wherein the first portion of the second side panel is operably coupled to the inner surface of the front panel, and further wherein the first and second side panels are operable between inwardly folded and extended positions;
a bottom panel having first and second portions interconnected along an articulating joint, wherein the first portion of the bottom panel is operably coupled to the inner surface of the front panel; and
a rear panel having first and second ends, wherein the first end is pivotally coupled to the second portion of the first side panel along an articulating joint, and further wherein the second end is pivotally coupled to the second portion of the second side panel along an articulating joint.

15. The storage compartment of claim 14, wherein the articulating joint disposed between the first and second portions of the first side panel is defined by a thinner material profile as compared to material profiles of the first and second portions of the first side panel.

16. The storage compartment of claim 14, wherein the first and second portions of the first side panel are comprised of a rigid material, and further wherein the articulating joint disposed between the first and second portions of the first side panel is defined by a strip of flexible material interconnecting the first and second portions of the first side panel at inner edges thereof.

17. The storage compartment of claim 14, wherein the front panel, the rear panel, the bottom panel and the first and second side panels are integrated to define a unitary whole.

18. The storage compartment of claim 17, wherein the front panel, the rear panel, the bottom panel and the first and second side panels cooperate to define an interior vessel operable between deployed and retracted conditions.

19. The storage compartment of claim 18, wherein one of the first side panel and the second side panel includes an inwardly extending support tab, and further wherein an outer surface of the bottom panel abuts an upper surface of the support tab when the interior vessel is in the deployed condition.

20. The storage compartment of claim 14, including:
a clip member having first and second portions, wherein the first portion of the clip member is pivotally coupled to the first portion of the first side panel along an upper edge thereof and the second portion of the clip member is releasably coupled to the second portion of the first side panel along an upper edge thereof, and further wherein the clip member is positioned over the articulating joint disposed between the first and second portions of the first side panel.

\* \* \* \* \*